(12) United States Patent  (10) Patent No.: US 6,495,025 B2
Velev  (45) Date of Patent: Dec. 17, 2002

(54) ELECTROCHEMICAL OXYGEN GENERATOR AND PROCESS

(75) Inventor: Omourtag Velev, La Crescenta, CA (US)

(73) Assignee: Aerovironment, Inc., Monrovia, CA (US)

( * ) Notice: Subject to any disclaimer, the term of this patent is extended or adjusted under 35 U.S.C. 154(b) by 82 days.

(21) Appl. No.: 09/838,370

(22) Filed: Apr. 20, 2001

(65) Prior Publication Data

US 2002/0153263 A1 Oct. 24, 2002

(51) Int. Cl.[7] ................................................. C25C 1/02
(52) U.S. Cl. ........................ 205/633; 205/628; 205/343; 205/346; 204/263; 204/266; 204/275.1; 204/278
(58) Field of Search ................................. 205/628, 629, 205/633, 634, 637, 343, 345, 346; 204/263, 266, 275.1, 278, 258

(56) References Cited

U.S. PATENT DOCUMENTS 3,180,813 A * 4/1965 Wasp et al. ................. 205/628
3,410,783 A    11/1968 Tomter
3,459,953 A    8/1969 Hughes et al.
4,021,323 A    5/1977 Kilby et al.
4,087,976 A    5/1978 Morrow, Jr. et al.
4,322,270 A *  3/1982 Skala ......................... 205/628
4,369,102 A    1/1983 Galluzzo et al.
4,950,371 A    8/1990 McElroy
5,041,197 A *  8/1991 Gelb .......................... 205/343
5,350,496 A    9/1994 Smith et al.
5,690,797 A    11/1997 Harada et al.
5,837,110 A    11/1998 Dean
6,423,203 B1 * 7/2002 Faita et al. .................. 205/343

* cited by examiner

Primary Examiner—Bruce F. Bell
(74) Attorney, Agent, or Firm—William W. Haefliger

(57) ABSTRACT

The method of producing $O_2$ from water, that includes subjecting water to electrolysis, to produce $H_2$ and $O_2$, returning $H_2$ to a water storage zone, drying the produced $O_2$, using air as a drying agent, flowing a stream of that drying agent air to the cathode side of fuel cell, flowing a stream of produced hydrogen to the anode side of the fuel cell, for reaction with $O_2$ in the agent air to produce water electrical energy and heat, and using electrical energy produced by fuel cell in the electrolysis.

12 Claims, 2 Drawing Sheets

ELECTROCHEMICAL OXYGEN GENERATOR AND PROCESS

BACKGROUND OF THE INVENTION

This invention pertains to the methods and devices capable of generating oxygen from water, and more particularly to the generation of oxygen by electrolysis to supplement an otherwise deficient condition, such as when a patient in a hospital is unable to breathe properly, or where the ambient atmosphere is deficient in oxygen, such as at high altitudes.

In hospitals, nursing homes, private homes, and other locations in which sick or elderly patients are cared for, or in aircraft traveling at high altitudes, a source of pure or high concentration oxygen is often necessary to assist in the breathing process. Because sick or elderly patients are sometimes unable to draw enough air into their lungs, the patient's breathing process is supplemented by the addition of pure oxygen. Because air is only 21% oxygen, the provision of pure or nearly pure oxygen greatly reduces the effort required on the part of the patient to acquire the requisite oxygen for life.

In the past, such oxygen has been supplemented through the use of pressurized tanks and/or liquid oxygen systems. While the tanks have been suitable for their intended purpose, they require pick-up, refilling, and delivery when the initial supply is depleted. In some environments, they also pose a fire hazard.

Some devices have been developed to separate, concentrate, or generate oxygen from ambient air. Many of these devices are based on nitrogen adsorption systems which concentrate oxygen from air to deliver a maximum of 95% $O_2$ by removing nitrogen from ambient air. U.S. Pat. No. 4,449,990 describes one such apparatus. Such devices require a parasitical purging of one tank by pure oxygen from another tank in order to maintain effectiveness. Further, moisture can be damaging to the nitrogen adsorption material.

To overcome the foregoing deficiencies in the art, there is need for a lightweight, quiet, inexpensive device which can generate pure oxygen in quantities small enough to be cost effective for single patient use.

SUMMARY OF THE INVENTION

The present invention contemplates a new and improved oxygen generating system which overcomes many of the foregoing difficulties and others while providing better and more advantageous overall results.

Basically, the invention relates to method and a device producing oxygen at ambient temperature from water on demand. The hydrogen which is a by-product of an electrolytic reaction is used in a hydrogen/air fuel cell to produce electrical power water and heat. Condensed water is returned to the water tank for further electrolysis and the produced electrical energy is used in the electrolysis process.

The basic and preferred method of the invention includes the steps:

a) subjecting water to electrolysis, to produce $H_2$ and $O_2$,
b) returning $H_2$ to a water storage zone,
c) drying the produced $O_2$ using air as a drying agent,
d) flowing a stream of that drying agent air to the cathode side of a fuel cell,
e) flowing a stream of produced hydrogen to the anode side of the fuel cell, for reaction with $O_2$ in the agent air to produce water electrical energy and heat,
f) and using electrical energy produced by the fuel cell in said electrolysis.

The method may include: providing a gas dryer through which said $O_2$ and dryer agent air are passed; providing a water storage tank from which water is supplied to the electrolysis; providing a water condenser for receiving the stream of air from the fuel cell, for condensing water from that stream; and/or providing a control system for monitoring electrical power produced by the fuel cell and used in such electrolysis.

Further, the method preferably includes removing water from a stream of air removed from the fuel cell and returning that removed water to the water storage zone, for return to said electrolysis.

These and other objects and advantages of the invention, as well as the details of an illustrative embodiment, will be more fully understood from the following specification and drawings, in which:

DRAWING DESCRIPTION

DETAILED DESCRIPTION

Figure 1:
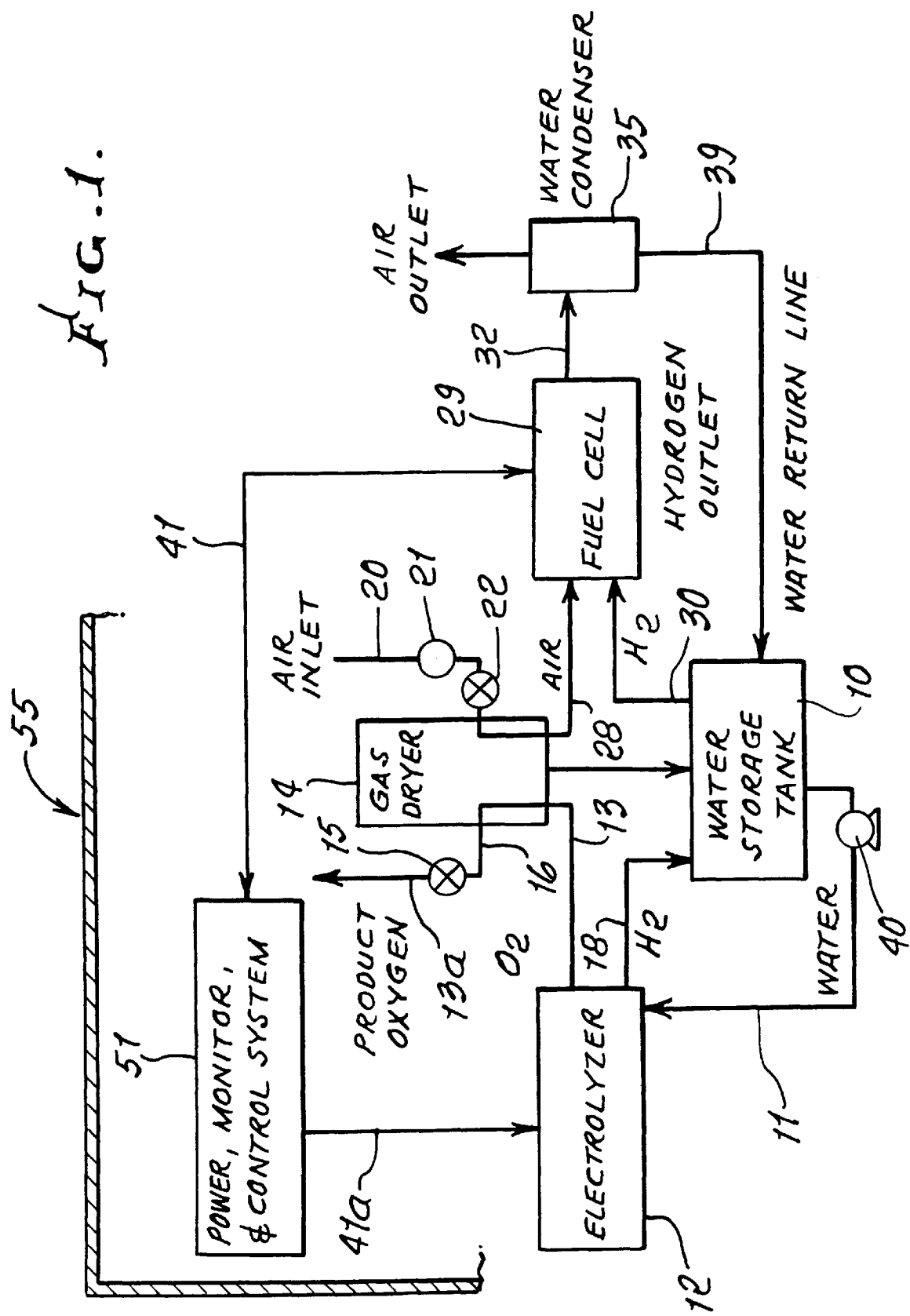
FIG. 1 shows a preferred system and/or method, embodying the invention.

FIG. 1, water is supplied from a storage tank 10 via path 11 to the cathode side of an electrolyser 12, which produces oxygen and hydrogen. Pure oxygen is delivered from the electrolyser via path 13 to a conditioner such as a gas dryer 14 and is dispensed as needed at 13*a*. A control valve 15 in the outlet path 16 from the dryer controls such dispensing, as needed. Hydrogen produced in the electrolyser, and unreacted water, are returned via path 18 to the storage tank 10.

Figure 2:
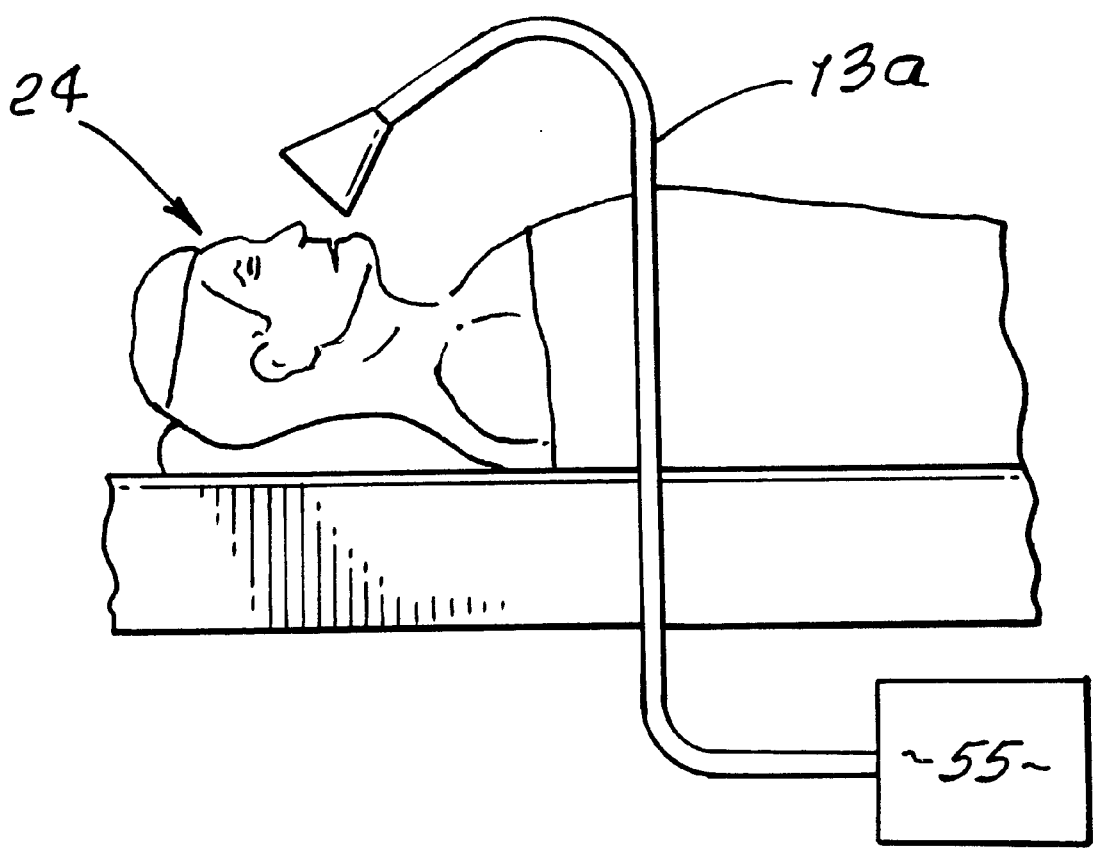
FIG. 2 shows the compact apparatus in use, servicing a human, such as a patient or passenger, whose respiratory system is being supplied with $O_2$.

Air is supplied to the gas dryer via path 20, and a blower 21 and control valve 22 may be employed in series with path 20. Such supplied air acts to dry the oxygen passing through the dryer. One usable commercially available dryer is identified as Model PD SOT, a product of Perma Pure, Inc. Pure oxygen available at 13*a* may be supplied to the respiratory tract of a human being such as a patient, indicated at 24 in FIG. 2. The need for bottled oxygen, under high pressure, is thereby avoided, as is the need for oxygen bottle replacement, in a supply system to a respiratory patient.

The discharge air from the dryer 14, which may be membrane type, is supplied via path 28 to the cathode of a fuel cell 29. Hydrogen produced by the electrolyser is also supplied at 30 to the anode of the fuel cell, where it reacts with oxygen in the air supplied at 28, to produce water, electrical power, and heat. The produced water is removed from the fuel cell and passed at 32 to a condenser 35. Such water such as moisture is typically carried in the excess air stream also passed at 32 to the condenser 35. Water condensed from the air stream is returned at 39 to the storage tank 10, from which it is supplied to the electrolyser, as via a pump 40 in path 11.

Electrical energy produced by the fuel cell is typically supplied via paths 41 and 41*a* to the electrolyser 12 for use in the electrolysis process. A power, monitor, and control system is indicated at 51, and is used to monitor and control the entire system, including pumps, valves, and other control elements, if used.

The oxygen supply apparatus described in connection with FIG. 1 may be contained in a housing 55, to operate as a self-contained, portable unit.

From the foregoing, the basic method of producing oxygen, i.e. $O_2$, from water, for supply and use as indicated, includes the steps:

a) subjecting water to electrolysis, to produce $H_2$ and $O_2$, b) returning $H_2$ to a water storage zone c) drying the produced $O_2$, using air as a drying agent, d) flowing a stream of that drying agent air to the cathode side of a fuel cell, e) flowing a stream of produced hydrogen to the anode side of the fuel cell, for reaction with $O_2$ in the agent air to produce water electrical energy and heat, f) and using electrical energy produced by fuel cell in said electrolysis.

I claim:

1. The method of producing $O_2$ from water, that includes:

a) subjecting water to electrolysis, to produce $H_2$ and $O_2$, b) returning $H_2$ to a water storage zone, c) drying the produced $O_2$, using air as a drying agent, d) flowing a stream of that drying agent air to the cathode side of a fuel cell, e) flowing a stream of produced hydrogen to the anode side of the fuel cell, for reaction with $O_2$ in the agent air to produce water, electrical energy and heat, f) and using electrical energy produced by the fuel cell in said electrolysis.

2. The method of claim 1 including providing a gas dryer through which said $O_2$ and drying agent air are passed.

3. The method of claim 2 wherein said gas dryer is a membrane type gas dryer.

4. The method of claim 1 including providing a water storage tank from which water is supplied to said electrolysis.

5. The method of claim 1 including providing a water condenser for receiving said stream of air from the fuel cell, for condensing water from that stream.

6. The method of claim 1 including providing a control system for monitoring electrical power produced by the fuel cell and used in said electrolysis.

7. The method of claim 1 including removing water from a stream of air removed from the fuel cell and returning said removed water to the water storage zone, for return to said electrolysis.

8. The method of claim 1 including supplying said produced $O_2$ to a human respiratory system.

9. The method of claim 7 including supplying said produced $O_2$ to a human respiratory system.

10. Apparatus for producing $O_2$ from water, that comprises, in combination:

a) an electrolyzer operable to subject water to electrolysis to produce $H_2$ and $O_2$, b) a water storage zone operatively connected to the electrolyzer to receive $H_2$ therefrom, c) a gas dryer for receiving said produced $O_2$ and for receiving a stream of air serving as a drying agent to dry the $O_2$ in the dryer, d) a fuel cell having a cathode side operatively connected with the dryer, to receive drying agent air therefrom, said fuel cell also having an anode side operatively connected with the electrolyser to receive produced $H_2$, for reaction in the fuel cell with oxygen in the drying agent air, to produce water, electrical energy and heat, e) removing means for removing a stream of air from the fuel cell, and for removing water from that air stream, for return to the water storage zone, f) and other means for supplying electrical energy produced by the fuel cell to said electrolyzer for operation thereof.

11. The combination of claim 10 wherein said removing means is a water condenser, for condensing water from said air stream.

12. The combination of claim 10 including a control system for monitoring said other means.

* * * * *